(12) United States Patent
Keating

(10) Patent No.: US 12,518,645 B2
(45) Date of Patent: Jan. 6, 2026

(54) MOBILE SURVEILLANCE SYSTEMS AND METHODS FOR UAS OPERATIONAL SUPPORT

(71) Applicant: Teledyne FLIR Defense, Inc., Thousand Oaks, CA (US)

(72) Inventor: Sean Keating, Elkridge, MD (US)

(73) Assignee: Teledyne FLIR Defense, Inc., Thousand Oaks, CA (US)

( * ) Notice: Subject to any disclaimer, the term of this patent is extended or adjusted under 35 U.S.C. 154(b) by 517 days.

(21) Appl. No.: 17/549,493

(22) Filed: Dec. 13, 2021

(65) Prior Publication Data

US 2022/0189319 A1 Jun. 16, 2022

Related U.S. Application Data

(60) Provisional application No. 63/125,390, filed on Dec. 14, 2020.

(51) Int. Cl.
| | |
|---|---|
| *G08G 5/56* | (2025.01) |
| *G08G 5/25* | (2025.01) |
| *G08G 5/34* | (2025.01) |
| *G08G 5/80* | (2025.01) |
| *H04N 7/18* | (2006.01) |
| *H04N 23/695* | (2023.01) |

(52) U.S. Cl.
CPC ............. *G08G 5/56* (2025.01); *G08G 5/25* (2025.01); *G08G 5/34* (2025.01); *G08G 5/80* (2025.01); *H04N 7/185* (2013.01); *H04N 23/695* (2023.01)

(58) Field of Classification Search
CPC .. G08G 5/0008; G08G 5/0043; G08G 5/0039; G08G 5/04; G08G 5/0013; G08G 5/0026; G08G 5/0069; G08G 5/0082; H04N 7/185; H04N 23/695
See application file for complete search history.

(56) References Cited

U.S. PATENT DOCUMENTS

| | | | | |
|---|---|---|---|---|
| 7,880,668 | B1 * | 2/2011 | Krause | G01S 7/40 342/75 |
| 2006/0253254 | A1 * | 11/2006 | Herwitz | G08G 5/0069 701/3 |
| 2012/0191333 | A1 * | 7/2012 | Sawhill | G08G 5/53 701/122 |
| 2014/0048672 | A1 * | 2/2014 | Woodruff | F16M 11/18 248/404 |
| 2014/0257692 | A1 * | 9/2014 | Stefani | G08G 5/0069 701/519 |

(Continued)

*Primary Examiner* — Aaron L Troost
(74) *Attorney, Agent, or Firm* — Haynes and Boone, LLP

(57) ABSTRACT

Mobile surveillance systems (MSSs) and related techniques are provided to improve the safety and operational flexibility of unmanned aircraft systems (UASs) and unmanned aerial vehicles (UAVs). An MMS includes an extendable mast and a modular sensor cluster couplable to the extendable mast. The MSS may also include a logic device configured to determine relative and/or absolute positions of UAVs within a selected airspace monitoring volume based, at least in part, on ranging sensor data provided by the modular sensor cluster, and to generate an airspace deconfliction display view corresponding to the selected airspace monitoring volume based, at least in part, on the determined relative and/or absolute positions of the UAVs and/or the selected airspace monitoring volume.

20 Claims, 10 Drawing Sheets

(56) References Cited

U.S. PATENT DOCUMENTS

| | | | | |
|---|---|---|---|---|
| 2014/0266887 A1* | 9/2014 | Blase | ................... | G01S 13/42 |
| | | | | 342/359 |
| 2014/0300508 A1* | 10/2014 | Booher | ................ | G01S 13/66 |
| | | | | 342/176 |
| 2015/0170524 A1* | 6/2015 | Stefani | ................. | G08G 5/26 |
| | | | | 701/120 |

* cited by examiner

MOBILE SURVEILLANCE SYSTEMS AND METHODS FOR UAS OPERATIONAL SUPPORT

CROSS-REFERENCE TO RELATED APPLICATIONS

This application claims the benefit of and priority to U.S. Provisional Patent Application No. 63/125,390 filed Dec. 14, 2020 and entitled "MOBILE SURVEILLANCE SYSTEMS AND METHODS FOR UAS OPERATIONAL SUPPORT," which is incorporated herein by reference in its entirety.

TECHNICAL FIELD

The present invention relates generally to surveillance systems and, more particularly, to systems and methods for mobile surveillance providing operational support for relatively lightweight unmanned aircraft.

BACKGROUND

Modern unmanned aircraft systems (UASs), which may include one or a variety of different unmanned aerial vehicles (UAVs), are often expected to operate over long distances and in all types of environments; rural, urban, and over other populated and/or unpopulated areas. Operation of systems incorporating such unmanned flight platforms may include real-time wireless transmissions between the platform and a remote base station, which may itself include a display to efficiently convey telemetry, imagery, and/or other sensor data captured by the platform to an operator. An autopilot or an operator may pilot or otherwise assist in or guide control of an unmanned flight platform throughout an entire mission relying solely on received data provided by the unmanned platform.

Flight of a UAV is increasingly regulated and may require safety measures designed to reduce and/or eliminate risk of damage to person and property. For example, current regulations over border inspection flights involving relatively inexpensive small unmanned aerial systems (sUASs) can require two operators (pilot and spotter) for each UAV of the sUAS to avoid in-air collisions, and such flights may further be restricted to sightline flight (approximately 1 km from the operator, depending on terrain and size of the UAV). Such restrictions can severely limit the cost effectiveness of using sUASs for border monitoring and other similar missions. Thus, there is a need for relatively cost and labor efficient systems and techniques for use with UASs to address such flight safety concerns.

SUMMARY

Mobile surveillance systems (MSSs) to provide operational support for unmanned aircraft systems (UASs) including one or more unmanned aerial vehicles (UAVs) and related techniques are provided to improve the operation of unmanned flight platforms. One or more embodiments of the described MSSs may advantageously include an extendable mast, a modular sensor cluster couplable to the extendable mast, and a logic device configured to communicate with and control the extendable mast and the modular sensor cluster. Embodiments may also include an orientation and/or position sensor to measure orientations and/or positions of the MSS, an MSS controller to control operation of the system, and one or more additional modules and/or sensors to measure and provide sensor data corresponding to maneuvering and/or other operation of the flight platforms and/or the MSS. In various embodiments, such additional sensors may include one or more visible spectrum and/or infrared cameras and/or other remote sensor systems coupled to the extendable mast.

In one embodiment, a system includes an extendable mast configured to be secured to a mobile terrestrial platform and provide an elevated modular sensor mount, a modular sensor cluster configured to couple to the modular sensor mount of the extendable mast and provide ranging sensor data corresponding to a selected airspace monitoring volume of the MSS, and a logic device configured to communicate with the extendable mast and the modular sensor cluster. The logic device may be configured to determine relative and/or absolute positions of the one or more UAVs within the selected airspace monitoring volume based, at least in part, on the ranging sensor data provided by the modular sensor cluster; and generate an airspace deconfliction display view corresponding to the selected airspace monitoring volume based, at least in part, on the determined relative and/or absolute positions of the one or more UAVs and/or the selected airspace monitoring volume.

In another embodiment, a method includes determining relative and/or absolute positions of one or more unmanned aerial vehicles (UAVs) within a selected airspace monitoring volume based, at least in part, on ranging sensor data provided by a modular sensor cluster of a mobile surveillance system (MSS) for an unmanned aircraft system (UAS) comprising the one or more UAVs; and generating an airspace deconfliction display view corresponding to the selected airspace monitoring volume based, at least in part, on the determined relative and/or absolute positions of the one or more UAVs and/or the selected airspace monitoring volume. The modular sensor cluster may be coupled to a modular sensor mount provided by an extendable mast of the MSS, and the extendable mast may be secured to a mobile terrestrial platform.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Modern unmanned aerial vehicles (UAVs) are able to operate over long distances and in all environments but are generally restricted in deployable range by regulations regarding pilot and/or spotter sight. Embodiments described herein increase the safe flight range by providing a mobile surveillance system (MSS) able to deploy to a variety of different locales and to provide airspace deconfliction data and views that may be used by an operator to safely fly beyond line of sight, particularly with respect to relatively small UAVs (e.g., that may become effectively invisible beyond 1 km).

Embodiments provide a multi-functional, rapidly deployable mobile capability that supports U.S. Customs and Border Protection's (CBP) mission to safeguard America's borders. The system is designed for modularity—enabling the end user to select from a variety of sensor solutions to best meet the challenges in the operational area it is deployed. Embodiments may be implemented with mid-to-long-range radars and imaging systems to perform multiple mission sets. For example, CBP can easily re-deploy embodiments from mountainous terrain to a coastal environment. Embodiments with radar may be optimized for maritime targets and include an AIS receiver that continuously provides information from sea vessel transponders. More specifically, embodiments may be configured to provide air domain awareness. Some small unmanned aerial system (sUAS) programs can be restricted to flying UAVs with a minimum of two operators on-site (pilot and spotter) in order to avoid in-air collisions. Furthermore, the range of the UAV may be limited by the operator's sightline (approximately 1 km). By utilizing embodiments of the described MSS in place of the spotter, labor is freed to perform other critical duties. Additionally, the capability of the MSS on-board technology allows operators to coordinate with local regulators for permission to fly aircraft beyond line of sight, with the MSS deconflicting air traffic in the area, as described herein.

Figure 1:
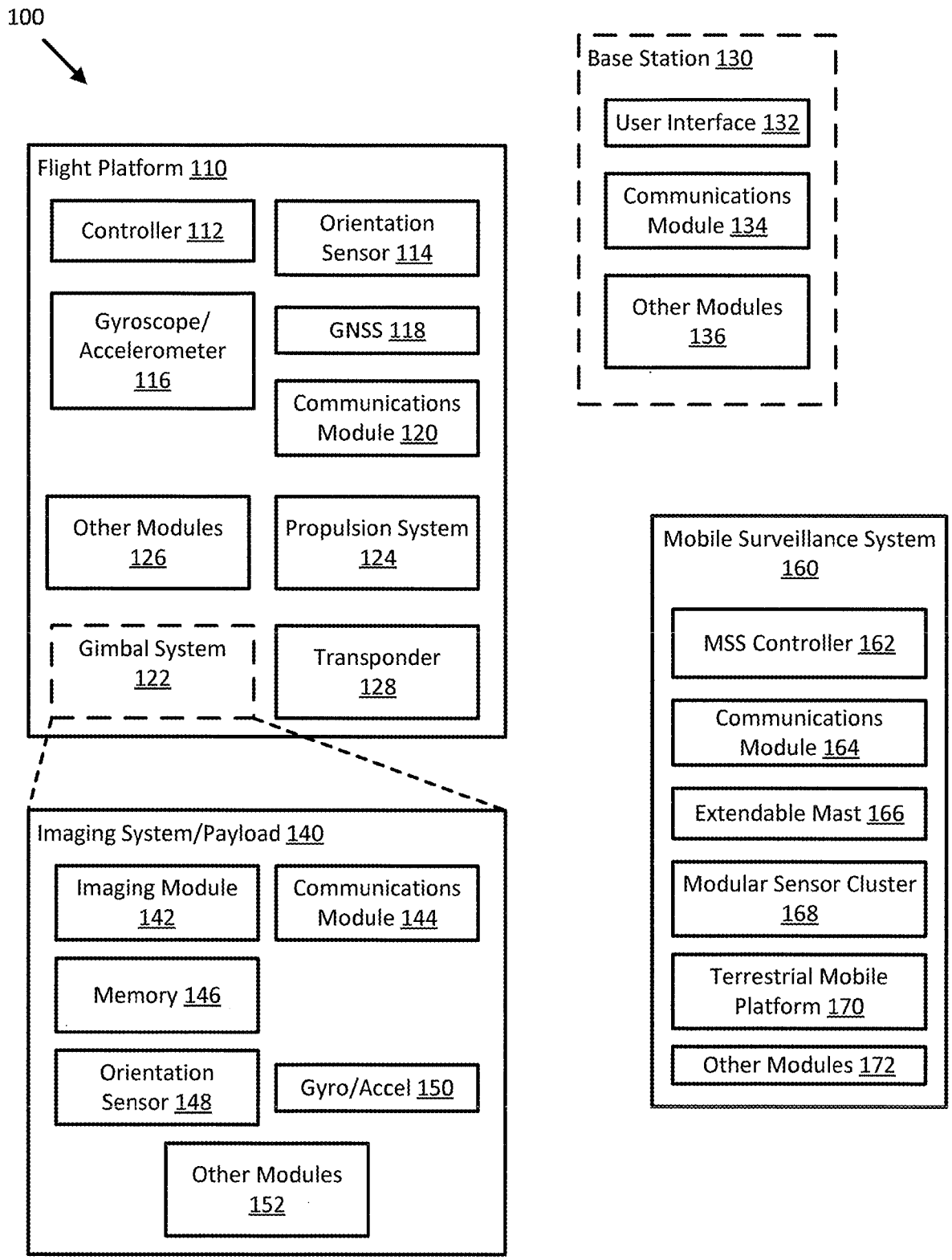
FIG. 1 illustrates a block diagram of an unmanned aircraft system (UAS) including a mobile surveillance system (MSS) in accordance with an embodiment of the disclosure.

FIG. 1 illustrates a block diagram of an unmanned aircraft system (UAS) 100 including an MSS 160 in accordance with an embodiment of the disclosure. In some embodiments, system 100 may be configured to fly over a scene, through a structure, or approach a target and image or sense the scene, structure, or target, or portions thereof, using gimbal system 122 to aim imaging system/sensor payload 140 at the scene, structure, or target, or portions thereof. Resulting imagery and/or other sensor data may be processed (e.g., by sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis.

In various embodiments, system 100 may be configured to use such imagery and/or sensor data to control operation of platform 110 and/or sensor payload 140, as described herein, such as controlling gimbal system 122 to aim sensor payload 140 towards a particular direction or controlling propulsion system 124 to move platform 110 to a desired position in a scene or structure or relative to a target.

In the embodiment shown in FIG. 1, UAS 100 includes platform 110, optional base station 130, and at least one MSS 160. In general, platform 110 may be a mobile platform configured to move or fly and position payload 140 and/or platform 110 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communications module 120, a gimbal system 122, a propulsion system 124, a transponder 128, and other modules 126. Sensor payload 140 may be physically coupled to platform 110 and be configured to capture sensor data (e.g., visible spectrum images, infrared images, narrow aperture radar data, analyte sensor data, orientation/attitude and/or position data, and/or other sensor data) of a target position, area, and/or object(s) as selected and/or framed by operation of platform 110 and/or base station 130, for example, and/or associated with maneuvering or navigation of platform 110, as described herein.

Operation of platform 110 may be substantially autonomous and/or partially or completely controlled by optional base station 130, which may include one or more of a user interface 132, a communications module 134, and other modules 136. In other embodiments, platform 110 may include one or more of the elements of base station 130, such as with various types of manned aircraft, terrestrial vehicles, and/or surface or subsurface watercraft. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, MSS 160, and/or base station 130, such as the position and/or orientation of platform 110, sensor payload 140, and/or base station 130, for example, and the status of a communication link established between platform 110, sensor payload 140, MSS 160, and/or base station 130. Such communication links may be configured to be established and then used to transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), optional gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112, base station 130, and/or MSS 160. In further embodiments, communications module 120 may be configured to receive sensor information from MSS 160 and relay the sensor data to controller 112 and/or base station 130. In various embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communications module 120 may be configured to monitor the status of a communication link established between platform 110, sensor payload 140, base station 130, and/or MSS 160. Such status information may be provided to controller 112, for example, or transmitted to other elements of system 100 for monitoring, storage, or further processing, as described herein. Communication links established by communication module 120 may be configured to transmit data between elements of system 100 substantially continuously throughout operation of system 100, where such data includes various types of sensor data, control parameters, and/or other data, as described herein.

In some embodiments, when present, optional gimbal system 122 may be implemented as an actuated gimbal mount, for example, that may be controlled by controller 112 to stabilize sensor payload 140 relative to a target or to aim and/or orient sensor payload 140 according to a desired direction and/or relative position. As such, gimbal system 122 may be configured to provide a relative orientation of sensor payload 140 (e.g., relative to an orientation of platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously. In still further embodiments, gimbal system 122 may be implemented as an actuated release mechanism to decouple and/or drop payload 140 according to control signals provided by controller 112 and/or relayed by communications module 120.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a navigational hazard in proximity to platform 110. In various embodiments, controller 130 may be configured to use such proximity and/or position information to help safely pilot platform 110 and/or monitor communication link quality, as described herein.

In various embodiments, transponder 128 may be implemented similar to communications module 120 but be configured solely to transmit identification information, telemetry, and/or other sensor data associated with flight platform 110 and/or other elements of system 100.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., visible spectrum and/or infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause platform 110 to move according to the target heading, route, and/or orientation, or to aim sensor payload 140 accordingly. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., sensor payload 140) associated with platform 110, for example, and to generate control signals for adjusting an orientation and/or position of the actuated device according to the target attitude, orientation, and/or position. Such control signals may be transmitted to controller 112 (e.g., using communications modules 134 and 120), which may then control platform 110 and/or elements of platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, platform 110, and/or MSS 160 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120, 134, and/or 164. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions. In alternative embodiments, where payload 140 is implemented as a package to be delivered to a target position, location, or destination, gimbal system 122 may be implemented as an actuated payload coupler configured to decouple or release or drop payload 140 (e.g., as controlled by controller 112, user interface 132, and/or other elements of system 100) from platform 110.

In various embodiments, MSS 160 may be implemented as a surveillance system with a variety of ranging and/or other sensors configured to monitor the airspace in which flight platform 110 is flying, such as to deconflict flight within the monitored airspace and/or provide additional airspace based operational support for flight platform 110, as described herein. In general, MSS 160 may be coupled to and/or include a mobile terrestrial platform in order to deploy to a number of different locations throughout the operational life of MSS 160. Moreover, by including modular sensor cluster 168, embodiments may mix and match different types of ranging and/or other types of sensors depending on the environment in which MSS 160 is deployed.

In the embodiment shown in FIG. 1, MSS 160 includes MSS controller 162, communications module 164, extendable mast 166, modular sensor cluster 168, terrestrial mobile platform 170, and/or other modules 170. In various embodiments, extendable mast 166 may be secured to terrestrial mobile platform 170 (e.g., configured to provide terrestrial mobility) and modular sensor cluster 168 may be configured to couple to a modular sensor mount of extendable mast 166 and provide ranging sensor data (e.g., radar, lidar, image data) corresponding to a selected airspace monitoring volume of MSS 160.

In various embodiments, modular sensor cluster 168 may include an actuated three-dimensional radar assembly configured to monitor and provide at least a portion of the ranging sensor data corresponding to approximately a quadrant of a hemispherical monitoring airspace volume centered at the elevated modular sensor mount of extendable mast 166. In other embodiments, modular sensor cluster 168 may include an actuated three-dimensional radar assembly configured to monitor and provide at least a portion of the ranging sensor data corresponding to at least a quadrant of a hemispherical monitoring airspace volume centered at the elevated modular sensor mount of extendable mast 166. Modular sensor cluster 168 may include an actuated imaging system configured to provide at least a portion of the ranging sensor data as image data, for example, and in some embodiments, communications module 164 may be integrated with modular sensor cluster 168.

MSS controller 162 may be configured to receive control signals and/or telemetry from platform 110 (e.g., via communications module 120 and/or transponder 128), for example, and/or to receive telemetry from sensors integrated with payload 140 (e.g., orientation sensor 148, gyroscope/accelerometer 150, other modules 152) and/or MSS 160 (e.g., other modules 170), and control operation of MSS 160 based, at least in part, on the received control signals and/or telemetry. In some embodiments, MSS controller 162 may be configured to control operation of MSS 160 independent of control signals and/or telemetry provided by other elements of platform 110, base station 130, and/or system 100.

More generally, MSS controller 162 may be implemented as one or more of any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of MSS 160 and/or other elements of MSS 160, for example. Such software instructions may also implement methods for processing sensor signals, determining sensor information, providing user feedback (e.g., through user interface 132 via communications through communications module 164), querying devices for operational parameters, selecting operational parameters for devices, or performing any of the various operations described herein.

In addition, a non-transitory medium may be provided for storing machine readable instructions for loading into and execution by MSS controller 162, and such non-transitory medium may be implemented as internal and/or external memory and/or associated interfaces. In these and other embodiments, MSS controller 162 may be implemented with other components where appropriate, such as volatile memory, non-volatile memory, one or more interfaces, and/or various analog and/or digital components for interfacing with modules of MSS 160 and/or devices of system 100. For example, MSS controller 162 may be adapted to store sensor signals, sensor information, parameters for coordinate frame transformations, calibration parameters, sets of calibration points, and/or other operational parameters, over time, for example, and provide such stored data to a user using user interface 132. In some embodiments, MSS controller 162 may be integrated with one or more other elements of MSS 160, for example, or distributed as multiple logic devices within platform 110, base station 130, and/or MSS 160.

In some embodiments, MSS controller 162 may be configured to substantially continuously monitor and/or store the status of and/or sensor data provided by one or more elements of MSS 160, such as the position and/or orientation of platform 110, MSS 160, and/or base station 130, for example, and the status of a communication link established between platform 110, MSS 160, and/or base station 130. Such communication links may be configured to be established and then transmit data between elements of system 100 substantially continuously throughout operation of system 100, where such data includes various types of sensor data, control parameters, and/or other data.

Communications module 164 of MSS 160 may be implemented as any wired and/or wireless communications module configured to transmit and receive analog and/or digital signals between elements of system 100, similar to other communications modules of system 100. For example, such communications module may be configured to receive control signals (e.g., control signals directing operation of MSS 160) from controller 112 and/or user interface 132. In some embodiments, such communications module may be configured to support spread spectrum transmissions, for example, and/or multiple simultaneous communications channels between elements of system 100.

Other modules 170 of MSS 160 may include other and/or additional sensors, actuators, communications modules/nodes, and/or user interface devices used to provide additional operational and/or environmental information associated with MSS 160, for example. In some embodiments, other modules 170 may include a humidity sensor, a wind and/or water temperature sensor, a barometer, an orientation sensor, a gyroscope/accelerometer, a GNSS, and/or other navigational or environmental sensors providing measurements and/or other sensor signals that can be displayed to a user and/or used by MSS controller 162 or other devices of system 100 (e.g., controller 112) to provide operational control of MSS 160, platform 110, and/or system 100, as described herein.

In various embodiments, other modules 170 may include a power supply implemented as any power storage device configured to provide enough power to each element of MSS 160 to keep all such elements active and operable while MSS 160 is otherwise disconnected from external power (e.g., provided by platform 170 and/or base station 130). In various embodiments, such power supply may be implemented by a supercapacitor so as to be relatively lightweight. Although system 100 is shown in FIG. 1 with a single MSS 160, in other embodiments, system 100 may include multiple MSSs 160.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
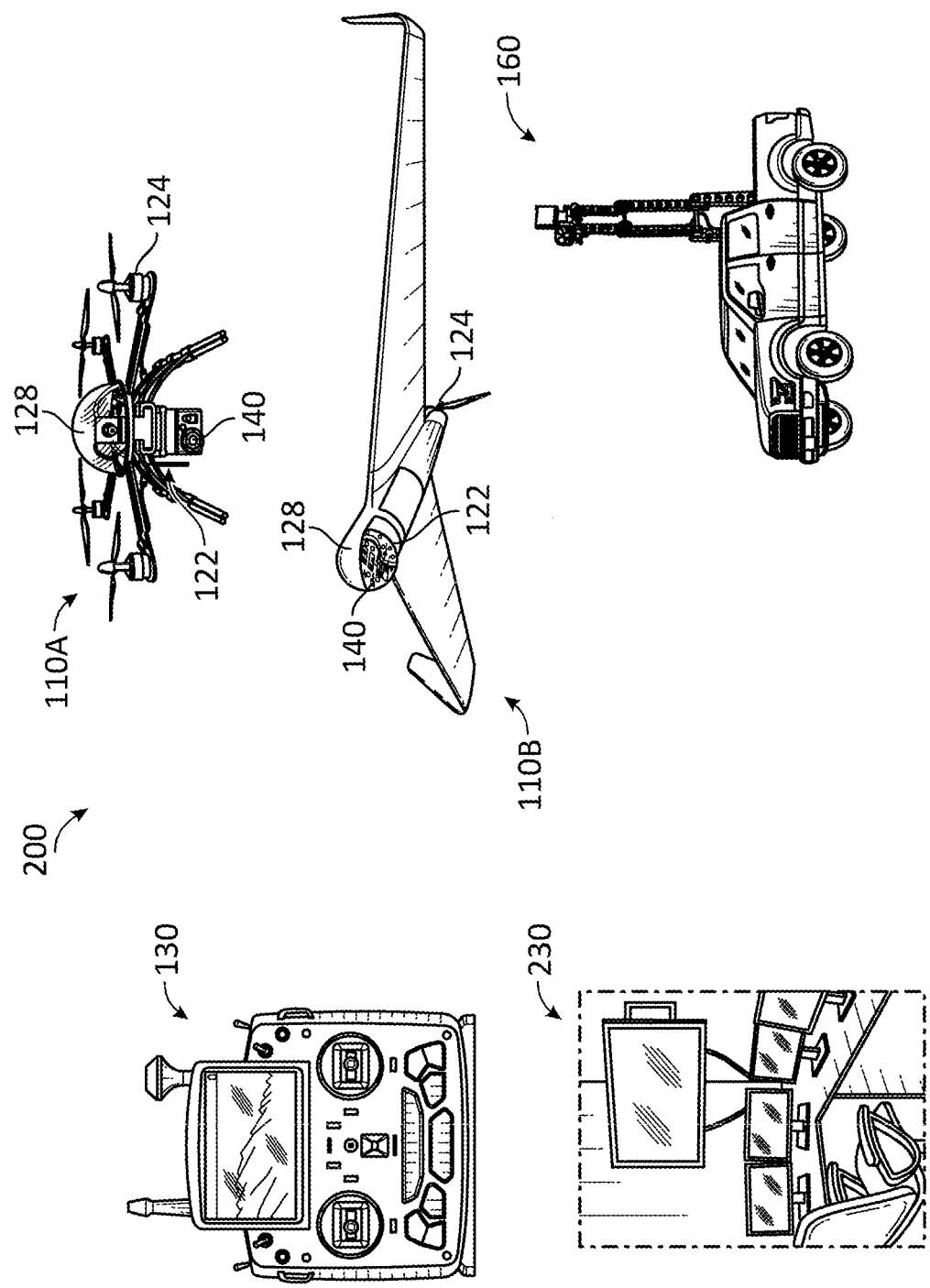
FIG. 2 illustrates a diagram of a UAS including multiple UAVs and an MSS in accordance with an embodiment of the disclosure.

FIG. 2 illustrates a diagram of mobile platforms/UAVs 110A and 110B of UAS 200 configured to receive operational support by embodiments of MSS 160 in accordance with an embodiment of the disclosure. In the embodiment shown in FIG. 2, UAS 200 includes base station 130, optional co-pilot station/remote aggregation server 230, mobile platform 110A with articulated imaging system/sensor payload 140, gimbal system 122, and transponder 128, and mobile platform 110B with articulated imaging system/sensor payload 140, gimbal system 122, and transponder 128, where base station 130 and/or optional co-pilot station 230 may be configured to control motion, position, orientation, and/or general operation of platform 110A, platform 110B, sensor payloads 140, and/or MSS 160.

In various embodiments, co-pilot station/remote aggregation server 230 may be implemented similarly relative to base station 130, such as including similar elements and/or being capable of similar functionality. In some embodiments, co-pilot station 230 may include a number of displays so as to facilitate operation of MSS 160 and/or various imaging and/or sensor payloads of mobile platforms 110A-B, generally separate from piloting mobile platforms 110A-B, and to facilitate substantially real time analysis, visualization, and communication of sensor data and corresponding directives, such as to first responders in contact with a co-pilot or user of system 200. For example, base station 130 and co-pilot station 230 may each be configured to render any display views described herein.

Figure 3:
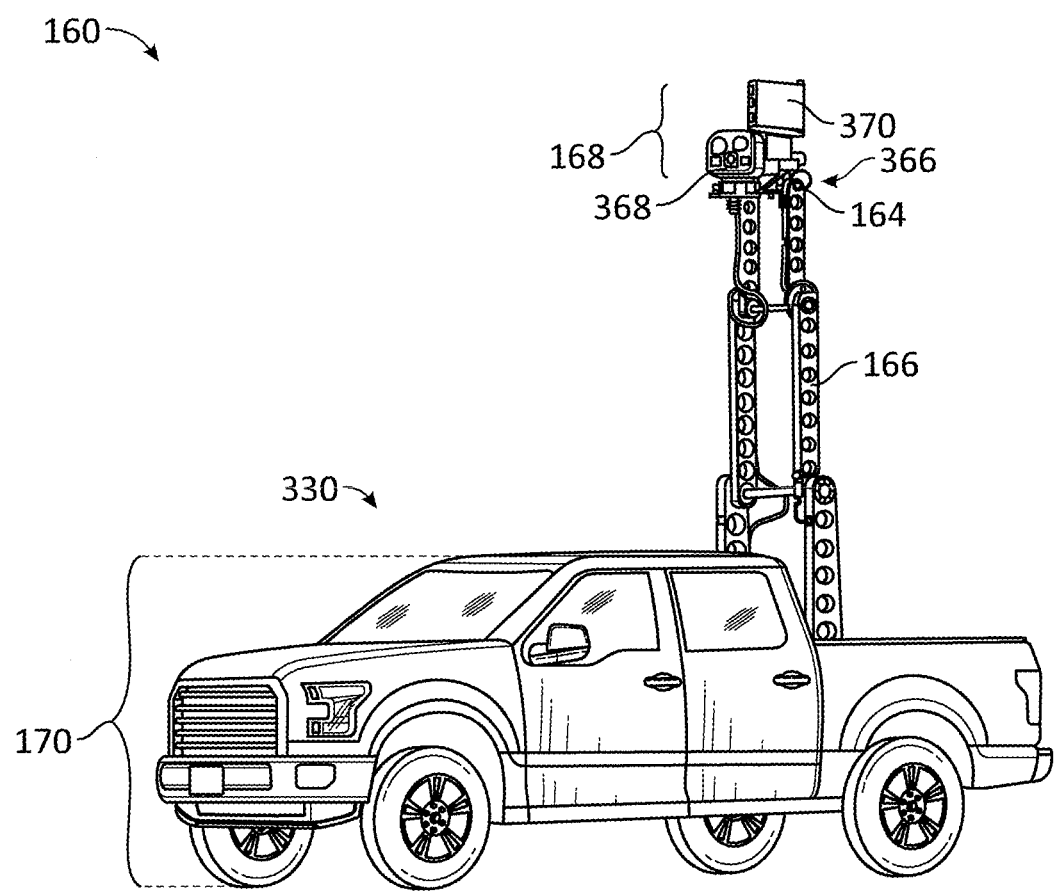
FIG. 3 illustrates a diagram of an MSS in accordance with an embodiment of the disclosure.

FIG. 3 illustrates a diagram of MSS 160 in accordance with an embodiment of the disclosure. In FIG. 3, MSS 160 includes extendable mast 166 providing elevated modular sensor mount 366, which may be used to couple to and/or mount modular sensor cluster 168. Extendable mast 166 may be secured to terrestrial mobile platform 170 (e.g., a pickup truck) and be able to collapse into a rear bed of terrestrial mobile platform 170 to protect MSS 160 during travel. Modular sensor cluster 168 may include a variety of sensors, including actuated 3D radar 370, actuated imaging system 368 (e.g., analogous to imaging system 140 and/or gimbal system 122), and/or communications module 164, which may be configured to receive transponder data from manned and unmanned aircraft, marine watercraft, and/or terrestrial vehicles.

Figure 4A:
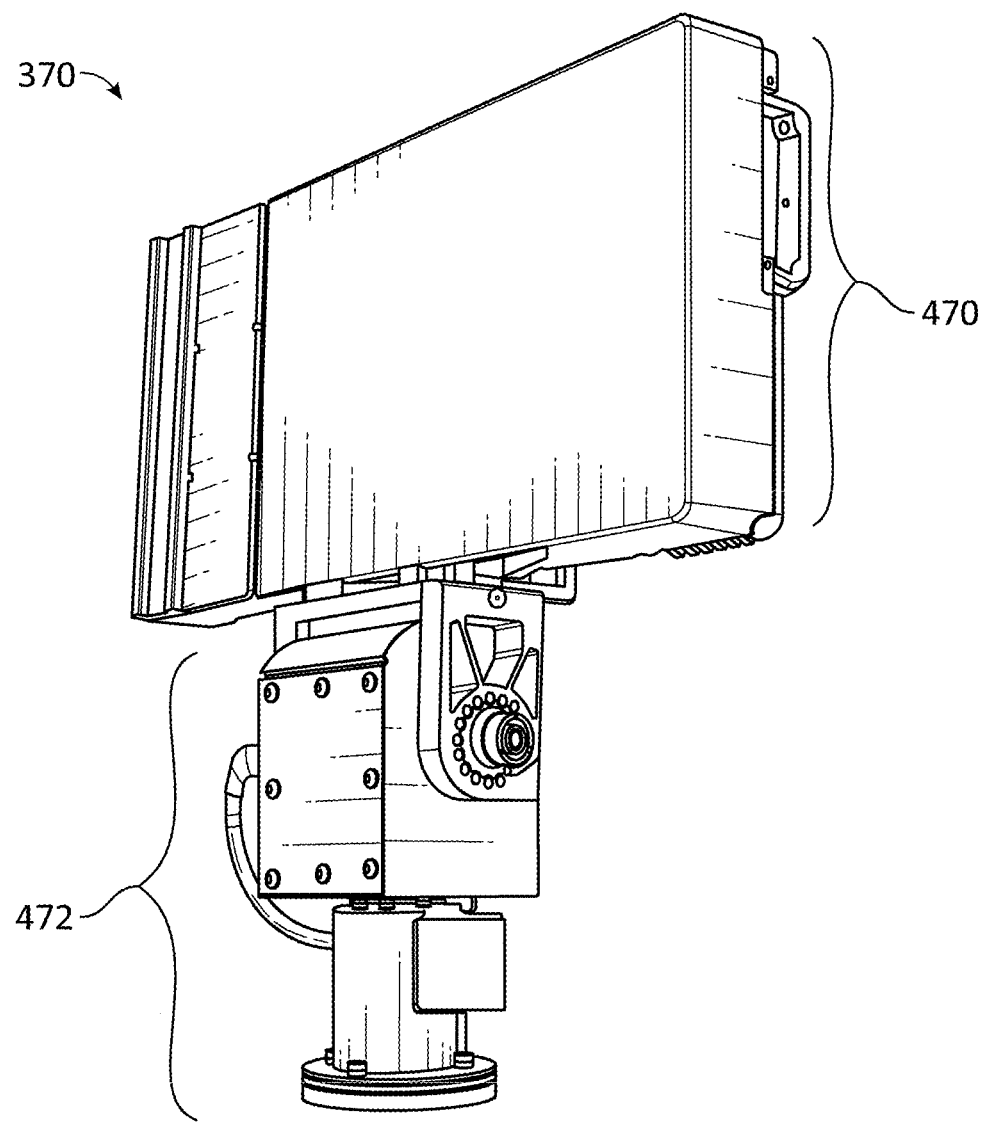
FIG. 4A illustrates a diagram of an actuated three-dimensional (3D) radar assembly for an MSS in accordance with an embodiment of the disclosure.

FIG. 4A illustrates a diagram of an actuated three-dimensional (3D) radar assembly 370 for MSS 160 in accordance with an embodiment of the disclosure. In FIG. 4A, actuated 3D radar assembly 370 includes radar panel 470 and actuated mount 472 (e.g., analogous to gimbal system 122) providing pan/tilt for radar panel 470. In various embodiments, radar assembly 370 may be configured to provide 10-8 k and/or 10-15 k range with angular accuracies of 0.8 or 0.5 degrees (azimuth) and 2 degrees (elevation) at 2 or 4 Hz, and may be configured to generate ranging data including relative and/or absolute position, identification, classification, and/or other target characteristics, as described herein.

Figure 4B:
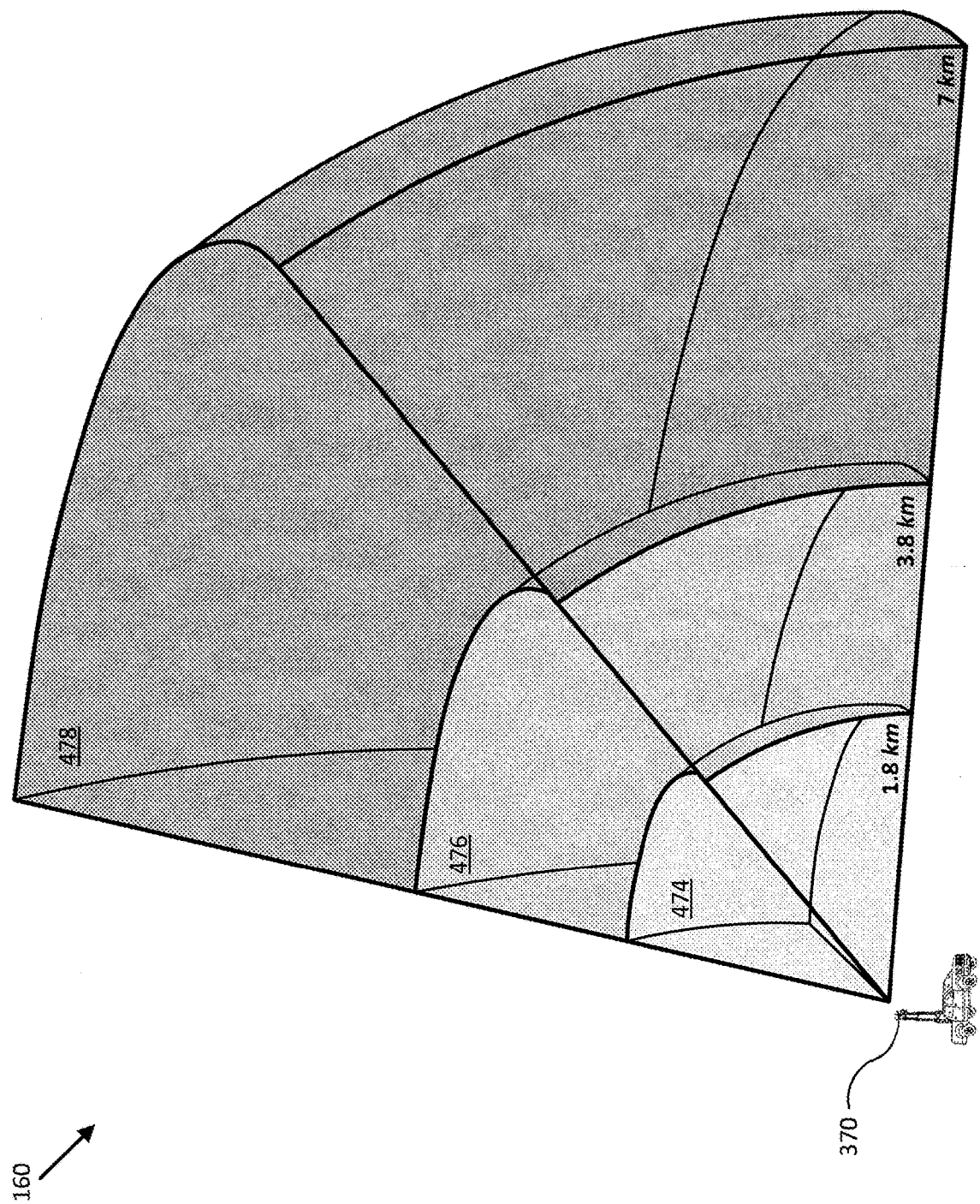
FIG. 4B illustrates a diagram of an actuated 3D radar assembly for an MSS in accordance with an embodiment of the disclosure.

FIG. 4B illustrates a diagram of actuated 3D radar assembly 370 for MSS 160 in accordance with an embodiment of the disclosure. In FIG. 4A, actuated 3D radar assembly 370 is configured to generate ranging data corresponding to airspace monitoring volumes 474, 476, and/or 478. Each volume may correspond to a quadrant of a hemisphere centered on MSS 160, for example, and may be swept around MSS 160 to generate 360 degrees of coverage, as described herein.

Figure 4C:
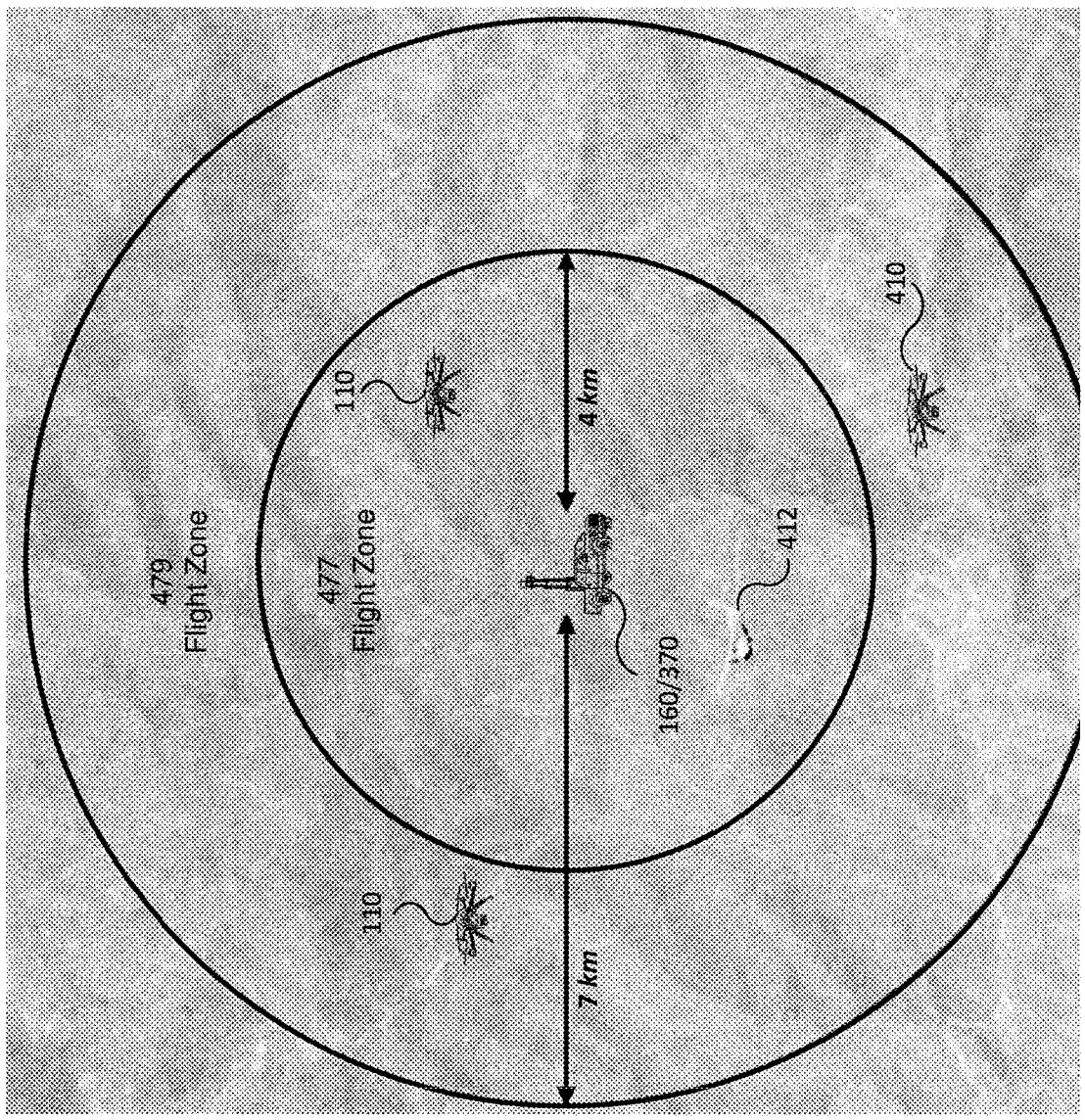
FIG. 4C illustrates a diagram of a UAS including an MSS with an actuated 3D radar assembly in accordance with an embodiment of the disclosure.

FIG. 4C illustrates a diagram of UAS 100 including MSS 160 with actuated 3D radar assembly 370 in accordance with an embodiment of the disclosure. In FIG. 4C, MSS 160 is detecting and determining positions of UAVs 110 of UAS 100, affiliated/unaffiliated aircraft 412, and unaffiliated UAV 410 within airspace monitoring volumes 477 and 479, such as by sweeping actuated 3D radar assembly 370 about MSS 160.

Figure 5:
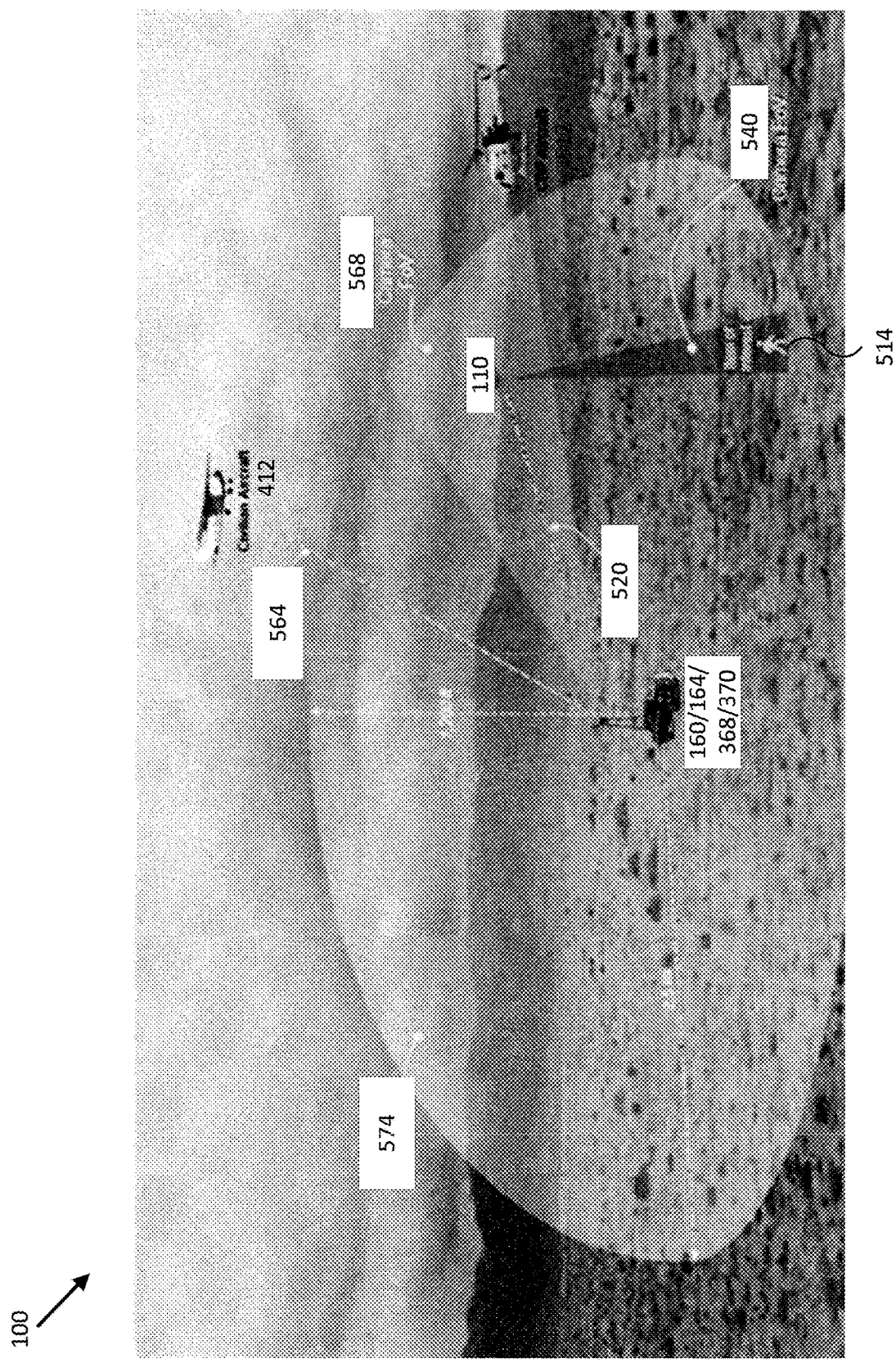
FIG. 5 illustrates a diagram of a UAS including an MSS with an actuated 3D radar assembly and an actuated imaging system in accordance with an embodiment of the disclosure.

FIG. 5 illustrates a diagram of a UAS 100 including MSS 160 with actuated 3D radar assembly 370, communications module 164, and actuated imaging system 368 in accordance with an embodiment of the disclosure. In FIG. 5, actuated 3D radar assembly 370 is monitoring field of regard 574 by sweeping through the hemisphere, communications module 164 is receiving transponder data from affiliated/unaffiliated aircraft 412, actuated imaging system 368 is providing image data associated with field of view 568 including UAV 110, UAV 110 is providing image data of person of interest/terrestrial target 514 according to field of view 540 of imaging system 140, and affiliated aircraft 512 is receiving and providing telemetry via MSS 160.

Figure 6:
FIGS. 6-7 illustrate display views generated by an MSS in accordance with an embodiment of the disclosure.
Figure 7:
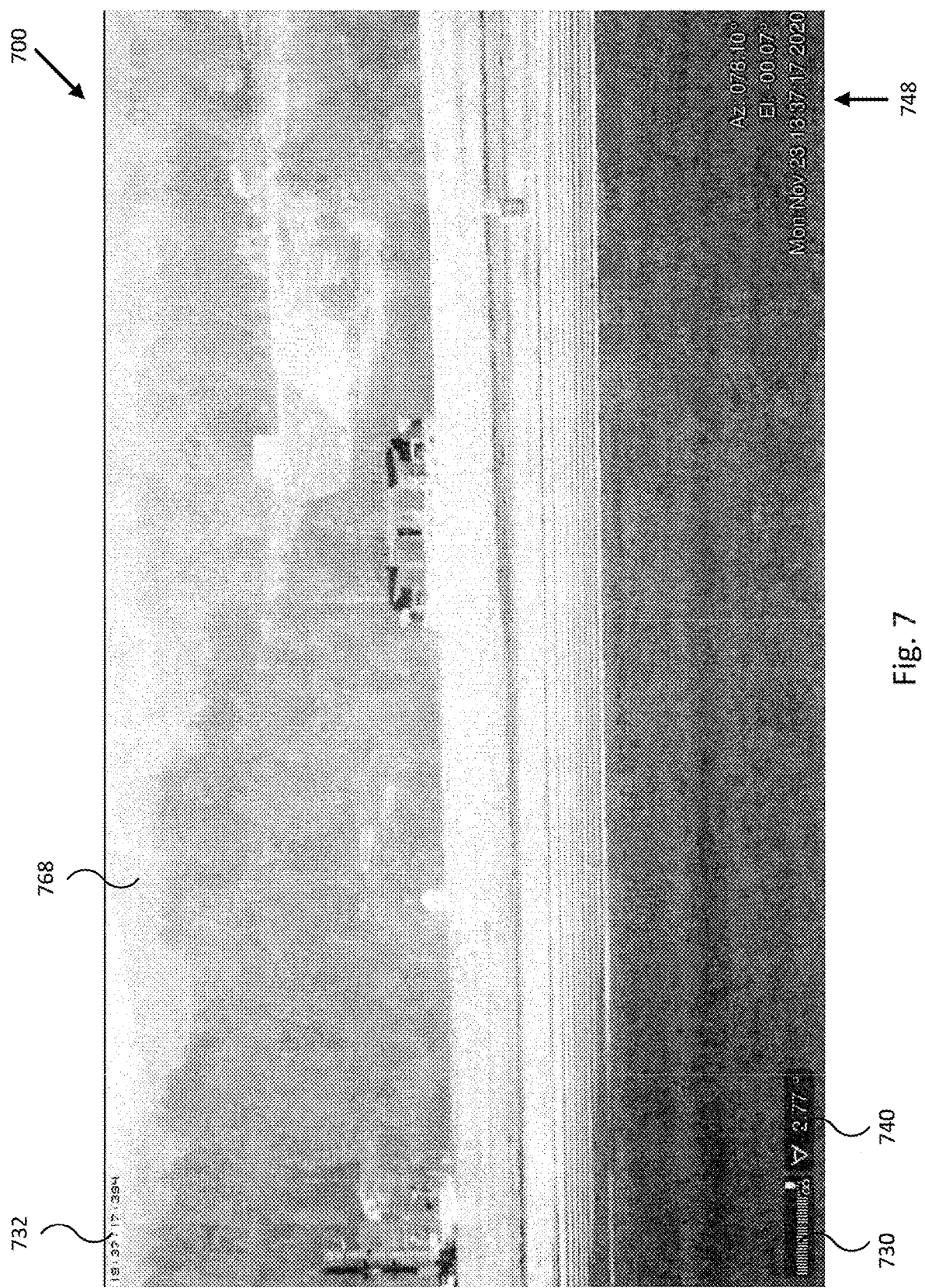

FIGS. 6-7 illustrate display views generated by an MSS in accordance with an embodiment of the disclosure. In FIG. 6, airspace deconfliction display view 600 includes chart data 602 (e.g., satellite and/or mapping chart data) underlying an MSS icon indicating a position of MSS 160, affiliated UAV position icon 610 and associated trajectory indicator 614, which may in some embodiment be a trajectory directive indicator configured to show a trajectory for UAV 610 to deconflict a flight path of UAV 610 relative to other aircraft within airspace deconfliction display view 600 (e.g., a selected airspace monitoring volume shown in airspace deconfliction display view 600). Also shown is unaffiliated UAV position icon 616 and associated trajectory indicator 618, along with detected and classified/identified target icons 620 and unclassified/unidentified but detected target 622. Also shown in airspace deconfliction display view 600 is field of view indicator 668 corresponding to the present field of view of actuated imaging system 368.

In FIG. 7, airspace deconfliction display view 600 includes image data 768 corresponding to field of view indicator 668 in FIG. 6, along with various information graphics, including present time graphic 732, recording graphic 730, field of view indicator 740, and image data characteristics indicator 748.

Figure 8:
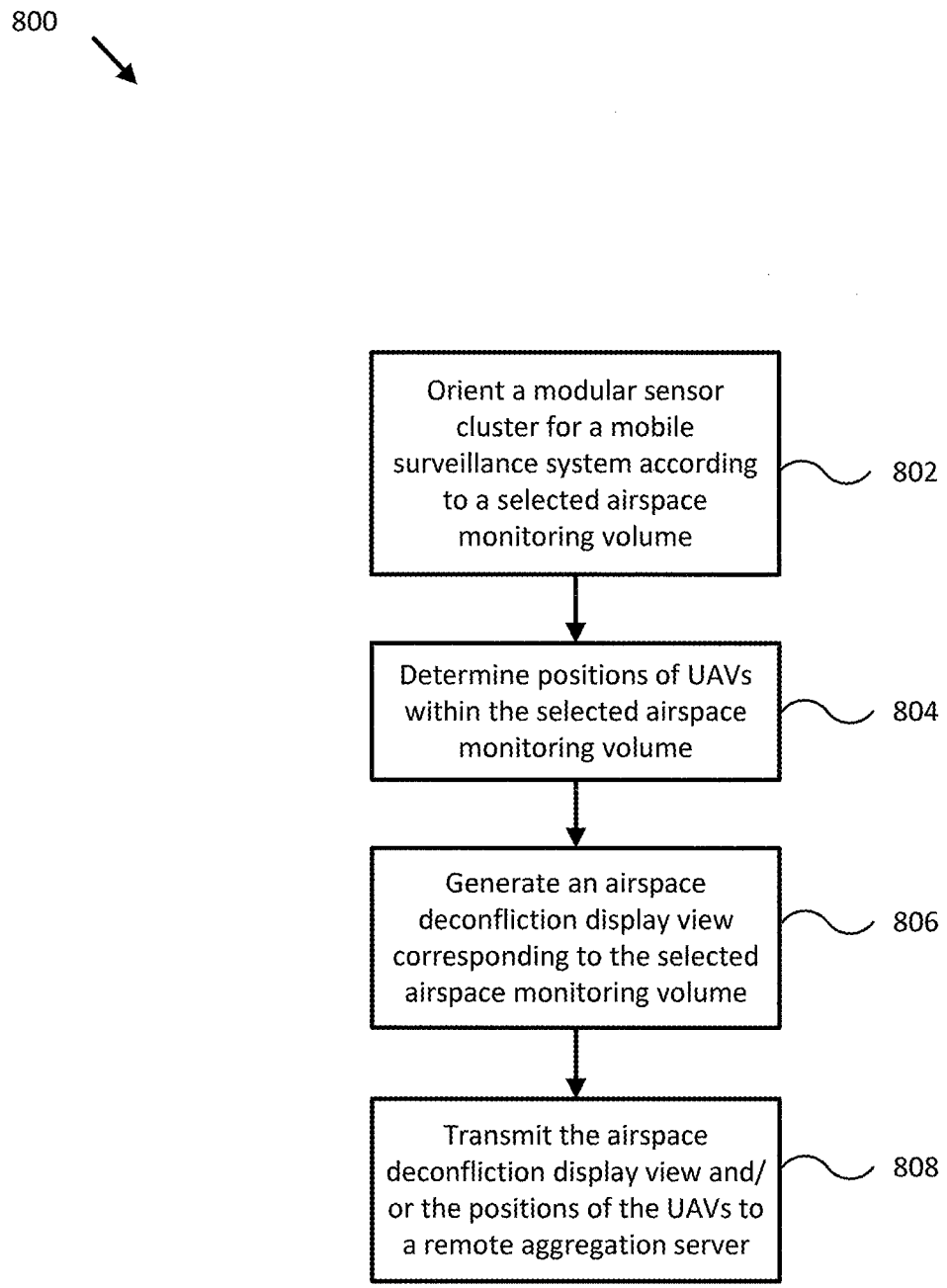
FIG. 8 illustrates a flow diagram of various operations to operate an MSS for UAS operational support in accordance with an embodiment of the disclosure.

FIG. 8 illustrates a flow diagram 800 of various operations to operate MSS 160 in accordance with an embodiment of the disclosure. In some embodiments, the operations of FIG. 8 may be implemented as software instructions executed by one or more logic devices or controllers associated with corresponding electronic devices, sensors, and/or structures depicted in FIGS. 1-7. More generally, the operations of FIG. 8 may be implemented with any combination of software instructions, mechanical elements, and/or electronic hardware (e.g., inductors, capacitors, amplifiers, actuators, or other analog and/or digital components). Any step, sub-step, sub-process, or block of process 800 may be performed in an order or arrangement different from the embodiment illustrated by FIG. 8. For example, in other embodiments, one or more blocks may be omitted from or added to process 800. Furthermore, block inputs, block outputs, various sensor signals, sensor information, calibration parameters, and/or other operational parameters may be stored to one or more memories prior to moving to a following portion of a corresponding process. Although process 800 is described with reference to systems described in FIGS. 1-7, process 800 may be performed by other systems different from those systems and including a different selection of electronic devices, sensors, assemblies, mechanisms, platforms, and/or platform attributes.

At block 802, a modular sensor cluster for an MSS is oriented. For example, MSS controller 162 may be configured to orient modular sensor cluster 168 for MSS 160 according to airspace monitoring volumes 474, 476, and/or 478, as described herein. In some embodiments, MSS controller 162 may be configured to receive user input identifying one or more of airspace monitoring volumes 474, 476, and/or 478 of MSS 160, elevate extendable mast 166 to provide elevated modular sensor mount 366, and/or orient 3D radar assembly 370 according to the received user input to monitor one or more of airspace monitoring volumes 474, 476, and/or 478 of MSS 160.

At block 804, positions of UAVs are determined. For example, MSS controller 162 may be configured to determine relative and/or absolute positions of one or more UAVs 110 within airspace monitoring volumes 474, 476, and/or 478 selected in block 802 based, at least in part, on ranging sensor data provided by modular sensor cluster 168, as described herein. In embodiments where MSS 160 includes actuated imaging system 368, MSS controller 162 may be configured to orient actuated imaging system 368 to image the determined relative and/or absolute positions of a selected one of the UAVs and/or unaffiliated aircraft within the selected airspace monitoring volume, as described herein. In other embodiments, MSS controller 162 may be configured to orient 3D radar assembly 370 to encompass the relative and/or absolute positions of a selected one of the UAVs within the selected one or more of airspace monitoring volumes 474, 476, and/or 478 of MSS 160. In still further embodiments, MSS controller 162 may be configured to determine relative and/or absolute positions of unaffiliated aircraft at least within the selected airspace monitoring volume based, at least in part, on the ranging sensor data provided by modular sensor cluster 368.

In block 806, an airspace deconfliction display view is generated. For example, MSS controller 162 may be configured to generate airspace deconfliction display view 600, 700 corresponding to airspace monitoring volumes 474, 476, and/or 478 selected in block 802 based, at least in part, on the relative and/or absolute positions of UAVs 110 determined in block 804 and/or the airspace monitoring volumes 474, 476, and/or 478 selected in block 802. In embodiments where MSS 160 includes actuated imaging system 368, MSS controller 162 may be configured to generate airspace deconfliction display view 600, 700 based, at least in part, on image data provided by actuated imaging system 368. In embodiments where MSS 160 includes communications module 164 (e.g., configured to receive transponder data from the UAVs and/or unaffiliated aircraft at least within the airspace monitoring volumes 474, 476, and/or 478 selected in block 802), MSS controller 162 may be configured to generate airspace deconfliction display view 600, 700 based, at least in part, on the received transponder data. In various embodiments, MSS controller 162 may be configured to generate airspace deconfliction display view 600, 700 based, at least in part, on the determined relative and/or absolute positions of unaffiliated aircraft detected near MSS 160.

More generally, generating the airspace deconfliction display views may include determining one or more deconfliction trajectories for the respective one or more UAVs within the selected airspace monitoring volume based, at least in part, on the determined relative and/or absolute positions of the one or more UAVs; and generating one or more trajectory directive indicators corresponding to the one or more deconfliction trajectories for rendering within the generated airspace deconfliction display view. In other embodiments, generating the airspace deconfliction display views may include determining one or more deconfliction trajectories for the respective one or more UAVs within the selected airspace monitoring volume based, at least in part, on the determined relative and/or absolute positions of the one or more UAVs; and transmitting one or more trajectory directive control signals corresponding to the one or more deconfliction trajectories to the respective one or more UAVs and/or associated base stations. In embodiments where UAV 110 includes imaging system 140, MSS controller 162 may be configured to receive image data from UAV 110 and generate airspace deconfliction display view 600, 700 based, at least in part, on the received image data from UAV 110.

In block 808, an airspace deconfliction display view and/or other data is transmitted to a remote aggregation server. For example, MSS controller 162 may be configured to transmit airspace deconfliction display view 600, 700, image data and/or other sensor data received from UAV 110, and/or the relative and/or absolute positions of UAV 110 via communications module 164 to a remote aggregation server (e.g., co-pilot station 230).

By providing such mobile surveillance systems and techniques for UAV operational support, embodiments of the present disclosure substantially improve the operational flexibility and reliability of unmanned flight platforms. Moreover, such systems and techniques may be used to increase the operational safety of unmanned flight platforms beyond that achievable by conventional systems. As such, embodiments provide UAV rescue parachute deployment systems with significantly increased convenience and performance.

The innovative use of an MSS with 3D radar allows operators of the system to gain air domain awareness, which can serve as a counter-UAS function or serve as an air traffic control support function to allow UAS operators to fly freely and safely. Specifically, embodiments allow UAS operators to fly safely beyond visual line of sight and relieves the operator of using a second person as a spotter to ensure the air is clear of other aircraft.

More generally, embodiments provide two main concepts of operation: Persistent Flight Zone—The MPS is deployed to a specified location and provides air domain awareness in the surrounding area, permitting multiple single pilot aircraft to fly beyond line of sight within the area; Mobile Flight Zone—The MSS is used in direct support of a single sUAS aircraft—providing mobile air domain awareness and ability to deploy with a single operator in any area.

Embodiments provide operators with a multi-functional tool that allows operators to perform a broad set of missions through improved efficiency and effectiveness. Specifically, embodiments achieve the following: Reduce Manpower Demand—Free operators to perform other critical duties and drive down total life cycle costs of operating sUAS systems; Increase Operating Range—Increase the effectiveness of sUAS platforms by supporting extended range of flights; Create Multifunctional Mobile Toolbox—Expand the capabilities of operator's existing technology portfolio to enable tailored response based on threat, topography, terrain, weather and other operational considerations; and Provide Remote Situational Awareness—Leverage proven communications tools to support decision makers at a central command stations (e.g., co-pilot station/remote aggregation server 230).

A skid based MSS converts a commercial pickup into a rapidly deployable command and control center. With radar and EO/IR cameras mounted to a 16-foot extendable mast, MSS 160 provides efficient surveillance coverage day and night. A single operator can deploy, operate, stow, and relocate—all from the cab of the truck. The modular, multi-functional design of MSS 160 allows end users to choose from multiple payload options, including an array of 3D radars. The 3D series of radars has the vertical coverage, low minimum detection velocity and algorithms to detect and track up to 500 airborne targets simultaneously. The radar can monitor the coverage area four times per second, detecting threats in virtually any climate, day and night. The radar's wide 45° beam elevation provides complete hemispherical detection of virtually every land and aerial target, including micro UAS. When mounted on the MSS via an actuated pan/tilt mount, the radar can provide 360° coverage. Such radars mitigate bird false alarms and inform the operator if the target is a person, vehicle, UAS, bird, or unknown. The radar reports target elevation, allowing cameras and countermeasures to point to targets. Multiple scan mode options include fixed sector, alternating sector, and continuous scan.

One embodiment of a UAV/UAS is an advanced military-grade sUAS which delivers a range of versatile Group 2-3 payload capabilities with the agility and single-operator deployment footprint of a proven Group 1 VTOL aircraft. Such embodiments can carry and deliver multiple payloads up to 4.4 lb, via an open architecture, and provide the fastest, most powerful embedded artificial intelligence (AI) computing engine available on an sUAS.

Embodiments of MSS 160 Improve Situational Awareness Through Technology—The technology solutions on MSS 160 offer a drastic increase in visibility range over human abilities. The system's imaging system extends the operator's visual line of sight up to 8 km in both day and night conditions. Outfitted with an actuated 3D radar, the system can detect sUAS at 7 km and larger aircraft up to 15 km. MSS 160 drastically increases situational awareness within the flight zone. Embodiments Improve Safety Through Redundancy—MSS 160, via system sensors and on-board toolkit, provides multi-layered air domain awareness through the following capabilities: Radar→Detection, Classification & Tracking of aircraft in the area, Camera→Visual Identification, AI Classification, ADS-B→Identification and Tracking of broadcasting aircraft, Team Awareness Kit→Identification and Tracking of operator sUASs. An MSS 160 command and control system may incorporate these data feeds to form a common operating picture for the agent, creating layers of redundancy to prevent in-air collisions.

Various use cases are envisioned. Option #1: Fixed Sector/Persistent Flight Zone. Concept of Operations: MSS 160 serves as the "control tower" for sUAS aircraft within a designated area. MSS 160 is outfitted with an actuated 3D radar and deployed in a specified position with a single operator. The radar is aimed in a fixed direction, providing 90° of ground and aerial coverage. An ADS-B receiver (transponder receiver, communications module 164) is used to track military and commercial aircraft within the airspace. MSS 160 operator may be responsible for air domain awareness within the designated airspace and can deconflict all sUAS traffic up to 1200 meters in elevation. The radar will alarm the operator and classify any target within range. The operator, by slewing the camera to the target, can further identify the target to determine whether it needs to be avoided. The position of any operator sUAS aircraft in the area will be broadcast to MSS 160 via the Team Awareness Kit. Through use of MSS 160 land mobile radio, the operator may communicate and deconflict airspace with the sUAS pilots in the field. Within the designated scanning sector, operator sUAS aircraft can be flown by a single pilot with ranges beyond line of sight within the covered area.

Option #2: 360° Scanning Sector. Concept of Operations: MSS 160 performs the control tower mission exactly as described in option 1 with coverage area expanded to 360°. Full radar coverage around the truck would be accomplished by installing back-to-back radar panels on top of the mast and using a 90-degree step panning function to detect targets.

Option #3: Mobile Flight Zone. A FLIR LVSS truck equipped with a R8SS-3D will enable a single operator to operate the sUAS aircraft from the cab of the truck with improved situational awareness and flight safety. As per current flight operations, the sUAS aircraft will connect to a base station and be operated via ruggedized tablet. The base station, however, will be directly connected to MSS 160, giving MSS 160 precise ownship position from the aircraft's on-board GPS. Embodiments will use the aircraft's position to continuously slew the actuated 3D radar and imaging system along the track of the aircraft, creating a surrounding area of situational awareness. Alarm zones, configured within the system, will notify the operator when an intrusion is detected within the aircraft's flight zone. The 3D radar may classify the target as person, vehicle, UAS, bird, or unknown. The imaging system (either of MSS 160 or UAV 110) can further identify targets via AI video analytics or further investigation by the operator.

Leveraging LVSS Capabilities for sUAS Operation—In addition to air domain awareness, MSS 160 offers the sUAS operator several key capabilities: TAK Integration—each MSS 160 is equipped with a communications module that can broadcast sUAS position and share pictures, videos and points of interest; Bi-Directional TAK—via connection to the operators remote TAK server, MSS 160 displays blue force tracking and positions of other operator technology assets; Video Archiving—through the connection to the base station, direct video from the aircraft may be displayed and archived via MSS 160 data processing system; Charging—MSS 160 design features power take off from the vehicle that can be leveraged to charge batteries, eliminating the need for a standalone generator; Antenna mounting-base station antennas can be mounted on the extendable mast to provide improved communications with the aircraft.

Cross-Functional, Multi-Layered Situational Awareness—In addition to providing a technology alternative to the human spotter, the integrated MSS/UAS package enables a single operator to accomplish a wide range of mobile surveillance missions simultaneously. Depending on mission need, the operator could utilize the quickly deployable MSS to provide video surveillance at ranges of 5+ miles. When items of interest move beyond line of sight, the operator deploys the actuated 3D radar to gain a new vantage point.

Enhance Response & Resolution—DETECT→IDENTIFY→CLASSIFY→TRACK→RESOLVE. Combining the capability set of MSS 160 and UAV 110 enables the operator to manage the apprehension process from detection to resolution. UAV 110 is a particularly effective tool in enhancing agent safety during apprehension by providing bird's eye video to agents and a deterrence to running or resisting arrest.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A mobile surveillance system (MSS) for an unmanned aircraft system (UAS) comprising one or more unmanned aerial vehicles (UAVs), the MSS comprising:
   an extendable mast configured to be secured to a mobile terrestrial platform and provide an elevated modular sensor mount;
   a modular sensor cluster configured to couple to the modular sensor mount of the extendable mast and provide ranging sensor data corresponding to a selected airspace monitoring volume of the MSS; and
   a logic device configured to communicate with the extendable mast and the modular sensor cluster, wherein the logic device is configured to:
      determine relative and/or absolute positions of the one or more UAVs within the selected airspace monitoring volume based, at least in part, on the ranging sensor data provided by the modular sensor cluster; and
      generate an airspace deconfliction display view corresponding to the selected airspace monitoring volume based, at least in part, on the determined relative and/or absolute positions of the one or more UAVs and/or the selected airspace monitoring volume;
   wherein:
      the MSS is configured to generate deconflicting alarms based at least in part on the relative and/or absolute positions of the one or more UAVs within the selected airspace monitoring volume as determined by the logic device;
      the MSS is configured, upon generating a deconflicting alarm, to communicate and deconflict the selected airspace monitoring volume with a pilot of at least one of the one or more UAVs pertinent to the alarm;
      the modular sensor cluster comprises an actuated three-dimensional radar assembly configured to monitor and provide at least a portion of the ranging sensor data corresponding to approximately a quadrant of a hemispherical monitoring airspace volume centered at the elevated modular sensor mount; and
      the logic device is configured to:
         receive user input identifying the selected airspace monitoring volume of the MSS; and
         elevate the extendable mast to provide the elevated modular sensor mount and/or orient the three-dimensional radar assembly according to the received user input to monitor the selected airspace monitoring volume of the MSS.

2. A mobile surveillance system (MSS) for an unmanned aircraft system (UAS) comprising one or more unmanned aerial vehicles (UAVs), the MSS comprising:
   an extendable mast configured to be secured to a mobile terrestrial platform and provide an elevated modular sensor mount;
   a modular sensor cluster configured to couple to the modular sensor mount of the extendable mast and provide ranging sensor data corresponding to a selected airspace monitoring volume of the MSS; and
   a logic device configured to communicate with the extendable mast and the modular sensor cluster, wherein the logic device is configured to:
      determine relative and/or absolute positions of the one or more UAVs within the selected airspace monitoring volume based, at least in part, on the ranging sensor data provided by the modular sensor cluster; and
      generate an airspace deconfliction display view corresponding to the selected airspace monitoring volume based, at least in part, on the determined relative and/or absolute positions of the one or more UAVs and/or the selected airspace monitoring volume;
wherein the MSS is configured to generate deconflicting alarms based at least in part on the relative and/or absolute positions of the one or more UAVs within the selected airspace monitoring volume as determined by the logic device;
wherein:
the MSS is configured to:
receive, from at least one UAV of the one or more UAVs, the at least one UAV's position;
use the at least one UAV's position to continuously slew a 3D radar of the MSS and an imaging system of the MSS along a track of the at least one UAV, creating a surrounding area of situational awareness; and
use an alarm zone configured within the MSS to issue a notification when an intrusion is detected within the at least one UAV's flight zone;
the modular sensor cluster comprises a communications module configured to receive transponder data from the one or more UAVs and/or unaffiliated aircraft at least within the selected airspace monitoring volume; and
the airspace deconfliction display view is based, at least in part, on the received transponder data.

3. The MSS of claim 2, wherein at least one of the following is true:
the MSS is configured, upon generating a deconflicting alarm, to communicate and deconflict the selected airspace monitoring volume with a pilot of at least one of the one or more UAVs pertinent to the alarm; and/or
the MSS is configured, upon generating a deconflicting alarm, to communicate with each control station controlling at least one of one or more UAVs pertinent to the deconflicting alarm.

4. The MSS of claim 3, wherein:
the MSS is configured, upon generating a deconflicting alarm, to communicate with each control station controlling at least one of the one or more UAVs pertinent to the deconflicting alarm; and
the modular sensor cluster comprises an actuated three-dimensional radar assembly configured to monitor and provide at least a portion of the ranging sensor data corresponding to at least a quadrant of a hemispherical monitoring airspace volume centered at the elevated modular sensor mount; and
the logic device is configured to:
orient the three-dimensional radar assembly to encompass the determined relative and/or absolute positions of a selected one of the one or more UAVs within the selected airspace monitoring volume.

5. The MSS of claim 3, wherein the logic device is configured to:
determine relative and/or absolute positions of unaffiliated aircraft at least within the selected airspace monitoring volume based, at least in part, on the ranging sensor data provided by the modular sensor cluster; and
generate the airspace deconfliction display view corresponding to the selected airspace monitoring volume based, at least in part, on the determined relative and/or absolute positions of the unaffiliated aircraft.

6. The MSS of claim 3, wherein the generating the airspace deconfliction display view comprises:
determining one or more deconfliction trajectories for the respective one or more UAVs within the selected airspace monitoring volume based, at least in part, on the determined relative and/or absolute positions of the one or more UAVs; and
generating one or more trajectory directive indicators corresponding to the one or more deconfliction trajectories for rendering within the generated airspace deconfliction display view.

7. The MSS of claim 3, wherein the generating the airspace deconfliction display view comprises:
determining one or more deconfliction trajectories for the respective one or more UAVs within the selected airspace monitoring volume based, at least in part, on the determined relative and/or absolute positions of the one or more UAVs; and
transmitting one or more trajectory directive control signals corresponding to the one or more deconfliction trajectories to the respective one or more UAVs and/or associated base stations.

8. The MSS of claim 3, wherein the logic device is configured to:
transmit the airspace deconfliction display view, image data received from the one or more UAVs, and/or the relative and/or absolute positions of the one or more UAVs within the selected airspace monitoring volume via the communications module to a remote aggregation server.

9. The MSS of claim 4, wherein the logic device is configured to:
receive image data from the one or more UAVs; and
generate the airspace deconfliction display view corresponding to the selected airspace monitoring volume based, at least in part, on the received image data from the one or more UAVs.

10. The MSS of claim 2, wherein:
the MSS is configured to be directly connected to a base station;
the modular sensor cluster comprises an actuated imaging system configured to provide at least a portion of the ranging sensor data as image data;
the logic device is configured to orient the actuated imaging system to image the determined relative and/or absolute positions of a selected one of the one or more UAVs and/or unaffiliated aircraft within the selected airspace monitoring volume; and
the airspace deconfliction display view is based, at least in part, on the image data provided by the actuated imaging system.

11. The method of claim 2, wherein the method comprises, upon generating a deconflicting alarm, communicating by the MSS with each control station controlling at least one of one or more UAVs pertinent to the deconflicting alarm;
wherein:
the modular sensor cluster comprises an actuated three-dimensional radar assembly configured to monitor and provide at least a portion of the ranging sensor data corresponding to at least a quadrant of a hemispherical monitoring airspace volume centered at the elevated modular sensor mount; and
the method comprises:
orienting the three-dimensional radar assembly to encompass the determined relative and/or absolute positions of a selected one of the one or more UAVs within the selected airspace monitoring volume.

12. The method of claim 2, further comprising, upon generating a deconflicting alarm, communicating by the MSS with a base station which is directly connected to the MSS; and
wherein:
the modular sensor cluster comprises an actuated imaging system configured to provide at least a portion of the ranging sensor data as image data;
the method comprises orienting the actuated imaging system to image the determined relative and/or absolute positions of a selected one of the one or more UAVs and/or unaffiliated aircraft within the selected airspace monitoring volume; and
the airspace deconfliction display view is based, at least in part, on the image data provided by the actuated imaging system.

13. The method of claim 2, further comprising:
determining relative and/or absolute positions of unaffiliated aircraft at least within the selected airspace monitoring volume based, at least in part, on the ranging sensor data provided by the modular sensor cluster; and
generating the airspace deconfliction display view corresponding to the selected airspace monitoring volume based, at least in part, on the determined relative and/or absolute positions of the unaffiliated aircraft.

14. The method of claim 2, wherein the generating the airspace deconfliction display view comprises:
determining one or more deconfliction trajectories for the respective one or more UAVs within the selected airspace monitoring volume based, at least in part, on the determined relative and/or absolute positions of the one or more UAVs; and
generating one or more trajectory directive indicators corresponding to the one or more deconfliction trajectories for rendering within the generated airspace deconfliction display view.

15. The method of claim 2, wherein the generating the airspace deconfliction display view comprises:
determining one or more deconfliction trajectories for the respective one or more UAVs within the selected airspace monitoring volume based, at least in part, on the determined relative and/or absolute positions of the one or more UAVs; and
transmitting one or more trajectory directive control signals corresponding to the one or more deconfliction trajectories to the respective one or more UAVs and/or associated base stations.

16. The method of claim 2, further comprising:
transmitting the airspace deconfliction display view, image data received from the one or more UAVs, and/or the relative and/or absolute positions of the one or more UAVs within the selected airspace monitoring volume to a remote aggregation server.

17. The method of claim 2, further comprising:
receiving image data from the one or more UAVs; and
generating the airspace deconfliction display view corresponding to the selected airspace monitoring volume based, at least in part, on the received image data from the one or more UAVs.

18. A method comprising:
determining relative and/or absolute positions of one or more unmanned aerial vehicles (UAVs) within a selected airspace monitoring volume based, at least in part, on ranging sensor data provided by a modular sensor cluster of a mobile surveillance system (MSS) for an unmanned aircraft system (UAS) comprising the one or more UAVs; and generating an airspace deconfliction display view corresponding to the selected airspace monitoring volume based, at least in part, on the determined relative and/or absolute positions of the one or more UAVs and/or the selected airspace monitoring volume, wherein:
the modular sensor cluster is coupled to a modular sensor mount provided by an extendable mast of the MSS; and
the extendable mast is secured to a mobile terrestrial platform; and
generating deconflicting alarms by the MSS based at least in part on the relative and/or absolute positions of the one or more UAVs within the selected airspace monitoring volume as determined by the logic device;
upon generating a deconflicting alarm, performing by the MSS at least one of:
communicating and deconflicting the selected airspace monitoring volume with a pilot of at least one of the one or more UAVs pertinent to the alarm; and/or
communicating by the MSS with each control station controlling at least one of the one or more UAVs pertinent to the deconflicting alarm;
using the MSS to:
receive, from at least one UAV of the one or more UAVs, the at least one UAV's position;
use the at least one UAV's position to continuously slew a 3D radar of the MSS and an imaging system of the MSS along a track of the at least one UAV, creating a surrounding area of situational awareness; and
use an alarm zone configured within the MSS to issue a notification when an intrusion is detected within the at least one UAV's flight zone;
wherein:
the modular sensor cluster comprises a communications module configured to receive transponder data from the one or more UAVs and/or unaffiliated aircraft at least within the selected airspace monitoring volume; and
the airspace deconfliction display view is based, at least in part, on the received transponder data.

19. The method of claim 18, wherein the method further comprises, upon generating a deconflicting alarm,
communicating by the MSS with each control station controlling at least one of the one or more UAVs pertinent to the deconflicting alarm.

20. The method of claim 19, wherein the method comprises, upon generating a deconflicting alarm, communicating and deconflicting the selected airspace monitoring volume with a pilot of at least one of the one or more UAVs pertinent to the alarm; and
wherein:
the modular sensor cluster comprises an actuated three-dimensional radar assembly configured to monitor and provide at least a portion of the ranging sensor data corresponding to approximately a quadrant of a hemispherical monitoring airspace volume centered at the elevated modular sensor mount; and
the method comprises:
receiving user input identifying the selected airspace monitoring volume of the MSS; and
elevating the extendable mast to provide the elevated modular sensor mount and/or orienting the three-dimensional radar assembly according to the received user input to monitor the selected airspace monitoring volume of the MSS.

* * * * *